(12) United States Patent
Park et al.

(10) Patent No.: US 7,707,851 B2
(45) Date of Patent: May 4, 2010

(54) AIR CONDITIONER

(75) Inventors: In Woong Park, Changwon-si (KR); Ja Hyung Koo, Changwon-si (KR); Seung Cheol Baek, Changwon-si (KR); Soo Yeon Shin, Gimhae-si (KR); Dong Hyuk Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 280 days.

(21) Appl. No.: 11/812,665

(22) Filed: Jun. 20, 2007

(65) Prior Publication Data
US 2008/0087031 A1    Apr. 17, 2008

(30) Foreign Application Priority Data
Oct. 17, 2006    (KR)    ...................... 10-2006-0100612

(51) Int. Cl.
*F25B 39/02*    (2006.01)
*F28D 5/00*    (2006.01)
(52) U.S. Cl. .......................................... 62/526; 62/305
(58) Field of Classification Search ...................... 62/90, 62/503, 513, 526
See application file for complete search history.

(56) References Cited
U.S. PATENT DOCUMENTS 3,979,923 A * 9/1976 Jennings ...................... 62/184
4,483,156 A * 11/1984 Oudenhoven .............. 62/324.1
5,113,668 A * 5/1992 Wachs et al. ................... 62/305
5,327,743 A * 7/1994 Coltrin ......................... 62/279
5,590,539 A * 1/1997 Marohl et al. ................... 62/84
5,666,813 A * 9/1997 Brune ............................. 62/90

FOREIGN PATENT DOCUMENTS

| CN | 1648558 | | 8/2005 |
|---|---|---|---|
| CN | 1846099 | | 10/2006 |
| JP | 2005214613 A | * | 8/2005 |

\* cited by examiner

*Primary Examiner*—Frantz F Jules
*Assistant Examiner*—Emmanuel Duke
(74) *Attorney, Agent, or Firm*—McKenna Long & Aldridge LLP (57) ABSTRACT

An air conditioner is provided. The air conditioner includes two or more heat exchangers, a refrigerant pipe, a compressor, an accumulator, and an overcooler. The heat exchangers perform heat exchanging between air or water and refrigerant. The refrigerant pipe guides refrigerant circulating between the two or more heat exchangers. The compressor compresses refrigerant flowing in the refrigerant pipe to a high temperature and pressure. The accumulator is provided on one side of the compressor, to separate an inflowing refrigerant into a liquid refrigerant and a gaseous refrigerant. The overcooler is provided on one side of the heat exchangers, to further cool refrigerant passing through the heat exchangers.

14 Claims, 7 Drawing Sheets

AIR CONDITIONER

This application claims the benefit of Korean Patent Application No. 10-2006-0100612, filed 17 Oct. 2006, which is hereby incorporated by reference for all purposes as if fully set forth herein.

BACKGROUND OF THE INVENTION

1. Field of the Invention

The present invention relates to an air conditioner, and more particularly, to an air conditioner having a plurality of overcooling pipes provided in a parallel or in-line formation, or having an overcooler with a combination of parallel and in-line pipe formations, in order to further cool refrigerant that has passed through a heat exchanger, thereby increasing the cooling effectiveness of the air conditioner.

2. Description of the Related Art

Generally, an air conditioner is a cooling/heating apparatus that cools or heats the air inside an indoor space of an office, home, etc. An air conditioner uses a refrigerant cycle in the sequence of compressing-condensing-expansion-evaporation to exchange heat between refrigerant and air to cool or heat air within a specific space.

Recently, air conditioners are being manufactured with not only basic cooling and heating functions, but other functions such as air purifiers that suction and filter contaminated indoor air and discharge clean air, dehumidifiers that convert humid air to dry air and discharge the latter back into an indoor space, and various other functions that ameliorate living.

Also, air conditioners can be divided into split air conditioners that have separate indoor units and outdoor units, and single unit air conditioners that integrate the indoor unit with the outdoor unit. Due to installation space and noise considerations, the split air conditioner is the preferred type today.

Instead of air-cooled air conditioners that use air to exchange heat with refrigerant to condition the air inside an indoor space, increased research and development is being done on water-cooled air conditioners that use water to exchange heat with refrigerant to condition the air inside an indoor space. This water-cooled type of air conditioner is a device that is favored as an alternative to the excessive power consumption of air-cooled air conditioners.

An air conditioner according to the related art includes indoor units that are respectively installed in individual indoor spaces for performing heat exchange of air within the indoor space, and outdoor units performing heat exchange of refrigerant and which are connected to the indoor units through pipes.

An indoor unit includes an indoor heat exchanger for exchanging heat between indoor air and refrigerant; and an outdoor unit includes a compressor for compressing the refrigerant, an outdoor heat exchanger for exchanging heat of refrigerant, etc. A refrigerant pipe fluidly communicates the indoor unit and outdoor unit and guides the flow of refrigerant therebetween.

The indoor unit suctions air from an indoor space to exchange heat between the air and refrigerant flowing within the indoor heat exchanger, and reintroduces the heat-exchanged air into the indoor space. This type of indoor unit is installed in a form that is suitable for its indoor space.

The outdoor unit guides the refrigerant that has passed through the inside of the indoor heat exchanger and exchanged heat with air from the indoor space to the inside of the outdoor heat exchanger, and performs heat exchanging within the outdoor heat exchanger.

The outdoor unit includes an overcooler that overcools the refrigerant flowing within the inside of the refrigerant pipe installed between the indoor heat exchanger and the outdoor heat exchanger.

This overcooler has a double-stacked pipe formed in a spiraling cylindrical shape with a hollow inner portion. That is, in an overcooler according to the related art, piping through which refrigerant flows is formed in a double spiral that encloses a passage for overcooling coolant to flow through.

However, in such a configuration according to the related art, the following problems arise.

In a water-cooled air conditioner according to the related art, the overcooler is formed in a stacked spiral pipe arrangement through which coolant flows, performing overcooling. Such an overcooler that performs overcooling with a stacked spiral pipe arrangement through which overcooling coolant flows, is dimensionally large by necessity. Due to the large size of the overcooler, the overall size of the air conditioner increases as well. Because the overall size of the air conditioner increases, the installation space for installing the air conditioner must be expansive, restricting the spaces in which the air conditioner may be installed and used.

Also, in general, because only one overcooler is installed on an existing air conditioner to perform overcooling according to the related art, it is insufficient to achieve a satisfactory degree of cooling. For the latter, an overcooler that excessively increases the dimensions of an air conditioner must be installed.

SUMMARY OF THE INVENTION

Accordingly, the present invention is directed to an air conditioner that substantially obviates one or more problems due to limitations and disadvantages of the related art.

An object of the present invention is to provide an air conditioner having a plurality of overcoolers installed in a row to further cool refrigerant that passes through a heat exchanger.

Another object of the present invention is to provide an air conditioner that has a plurality of overcoolers installed in-line for sequentially cooling refrigerant that passes therethrough after having passed through a heat exchanger.

A further object of the present invention is to provide an air conditioner that has a plurality of overcoolers arranged in a row or in-line, so that cooling of refrigerant is more effectively performed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an air conditioner including: two or more heat exchangers for performing heat exchanging between air or water and refrigerant; a refrigerant pipe for guiding refrigerant circulating between the two or more heat exchangers; a compressor for compressing refrigerant flowing in the refrigerant pipe to a high temperature and pressure; an accumulator provided on one side of the compressor, for separating an inflowing refrigerant into a liquid refrigerant and a gaseous refrigerant; and an overcooler provided on one side of the heat exchangers, for further cooling refrigerant passing through the heat exchangers, the overcooler including a plurality of overcooling pipes fluidly connected in parallel.

In another aspect of the present invention, there is provided an air conditioner including: two or more heat exchangers for performing heat exchanging between air or water and refrigerant; a refrigerant pipe for guiding refrigerant circulating between the two or more heat exchangers; a compressor for compressing refrigerant flowing in the refrigerant pipe to a high temperature and pressure; an accumulator provided on one side of the compressor, for separating an inflowing refrigerant into a liquid refrigerant and a gaseous refrigerant; and an overcooler provided on one side of the heat exchangers, for further cooling refrigerant passing through the heat exchangers, the overcooler including a plurality of overcooling pipes fluidly connected in series.

In a further aspect of the present invention, there is provided an air conditioner including: two or more heat exchangers for performing heat exchanging between air or water and refrigerant; a refrigerant pipe for guiding refrigerant circulating between the two or more heat exchangers; a compressor for compressing refrigerant flowing in the refrigerant pipe to a high temperature and pressure; an accumulator provided on one side of the compressor, for separating an inflowing refrigerant into a liquid refrigerant and a gaseous refrigerant; and an overcooler provided on one side of the heat exchangers, for further cooling refrigerant passing through the heat exchangers, the overcooler including a plurality of overcooling pipes connected in a combination of parallel and serial connections.

As described above, in the air conditioner according to the present invention, coolant passes a plurality of overcooling pipes to be overcooled. That is, when the air conditioner is operating in cooling mode, the coolant that is overcooled by the plurality of overcooling pipes passes through the first heat exchanger and exchanges heat with air from an indoor space.

Here, the coolant that has passed through the overcooler exchanges heat with air of the indoor space to create cooler indoor air. The air that is thus cooled is then discharged to a space to be conditioned.

Accordingly, the overcooler increases the heat exchanging effectiveness of the cooled coolant, so that energy consumption for heat exchange can be made more efficient. That is, the cost of operating the air conditioner is effectively reduced through more efficient consumption of energy.

Also, when an air conditioner having the overcooler installed according to the present invention is operated to condition a space, air in the space can be conditioned more quickly, so that the operating time of the air conditioner can be reduced.

By conditioning the space in less time, the level of convenience and product reliability experienced by a user increases.

Additionally, compared to the spiraling stacked overcooler according to the related art, the overcooler according to the present invention that is formed in-line uses space more efficiently. That is, the overcooler can be installed in a smaller installation space.

Thus, by increasing space utilization efficiency decreasing the space needed for the overcooler, the overall size of the air conditioner can be compacted. Compacting the overall size of the air conditioner reduces the space needed to install the air conditioner and thus allows the user to more efficiently utilize available space.

Furthermore, by compacting the overall size of the air conditioner, not only is the instability of the air conditioner increased, its manufacturing cost is also reduced.

Also, by compacting the overall size of the air conditioner, the air conditioner's portability increases.

It is to be understood that both the foregoing general description and the following detailed description of the present invention are exemplary and explanatory and are intended to provide further explanation of the invention as claimed.

DETAILED DESCRIPTION OF THE INVENTION

Reference will now be made in detail to an embodiment of the present invention, example of which is illustrated in the accompanying pages.

Reference will now be made in detail to the preferred embodiments of the present invention, examples of which are illustrated in the accompanying drawings. The invention may, however, be embodied in many different forms and should not be construed as being limited to the embodiments set forth herein.

Figure 1:
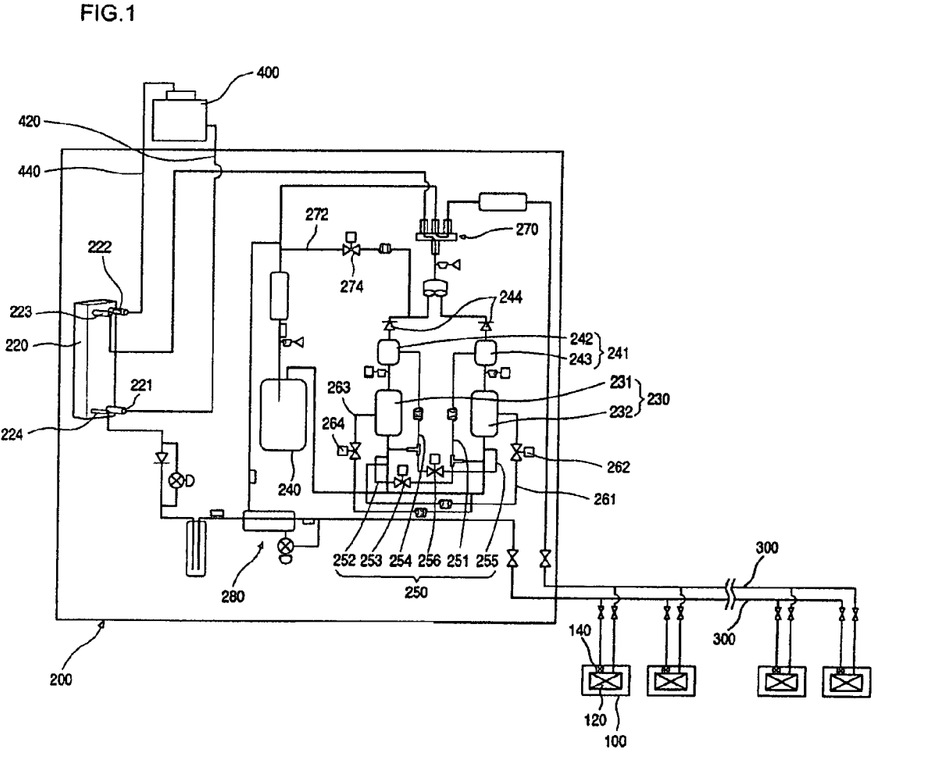
FIG. 1 is a block configurative diagram of a multi-unit water-cooled air conditioner according to a preferred embodiment of the present invention.

FIG. 1 is a block configurative diagram of a multi-unit water-cooled air conditioner according to a preferred embodiment of the present invention.

A multi-unit water-cooled air conditioner is installed in a building with a plurality of separate indoor spaces, such as a large office building or high-rise apartment building, in order to condition the indoor air of the plurality of indoor spaces.

The multi-unit water-cooled air conditioner according to the present invention includes a plurality of indoor units 100 of which one is provided within each indoor space, and a plurality of outdoor units 200 respectively installed to a side of the indoor spaces in which the indoor units 100 are installed, and connected respectively to each of the indoor units 100 through pipes.

The indoor units 100 are each installed in a suitable manner within the respective indoor spaces to condition the air within the indoor spaces. That is, the indoor units 100 used may be standing, ceiling-mount, wall-mount, and other types of units that are installed according to users' preferences. These indoor units 100 are installed to communicate with the outdoor units 200 through refrigerant pipes 300. The refrigerant pipes 300 are cylindrical pipes having predetermined diameters to guide the flow of refrigerant between the indoor units 100 and outdoor units 200.

The indoor units 100 suction the air inside the indoor spaces, perform heat exchanging of the suctioned air with refrigerant, and re-introduce the heat exchanged air into the indoor spaces, to condition the air within the indoor spaces according to users' preferences.

The water-cooled air conditioner according to the present invention includes a cooling tower 400 for cooling water flowing therein installed on a roof, etc. of a building. The cooling tower 400 puts water directly in contact with air to cool the water. That is, when water comes into contact with cold air, a portion of the water evaporates, and the heat used for the evaporation is radiated into the air to lower the temperature of the water. Using this phenomenon, the cooling tower 400 runs water from its top portion in a downward direction and injects air at its lower end to cool the water.

The water cooled within the cooling tower 400 is guided by a water supply pipe 420 to interior spaces of the outdoor units 200. The water supply pipe 420 is formed in the shape of a hollow cylindrical pipe with a predetermined diameter, and is installed along outer surfaces of a building. Alongside the water supply pipe 420 is a water return pipe 440 that is provided in the same form as the water supply pipe 420, for returning water that has exchanged heat with refrigerant inside the outdoor units 200 to the cooling tower 400.

Accordingly, the water that is cooled within the cooling tower 400 is guided by the water supply pipe 420 to the flow into the outdoor units 200, so that it exchanges heat with refrigerant inside the outdoor units 200. Then, the water returns to the top of the cooling tower 400 through the water return pipe 440, after which it is re-cooled within the cooling tower 400 to flow back into the outdoor units 200 in a repetitive cycle.

A cooling water pump (not shown) is installed on the water supply pipe 420 to supply the water that is cooled within the cooling tower to each of the outdoor units 200 at an even pressure. The pump is a device that ensures that an even supply of water at an even pressure flows into the outdoor units.

The water return pipe that guides the water that exchanges heat with refrigerant inside the outdoor units 200 back to the cooling tower 400 has a water return valve (not shown) installed thereon. The water return valve controls the amount of water (supplied from the cooling tower 400 to the outdoor units 200 after the water has exchanged heat with refrigerant) that returns through the water return pipe 440.

That is, when the air conditioner is operating normally, the water return valve is opened to allow the water that has exchanged heat in the outdoor units 200 with refrigerant to return to the cooling tower 400. However, when one floor from a plurality of floors in a building is not operating the air conditioner, the water return valve is closed so that the water that fills the inside of the outdoor units 200 cannot return to the cooling tower 400.

The reason for preventing the water that fills the inside of the outdoor units 200 from returning to the cooling tower 400 is to prevent hot refrigerant (flowing into the compressor (to be described below) and consequent damage to the compressor when an air conditioner that has not been operating is operated, due to the outdoor unit being heated by the circulating heat exchanged water at the initial operating point of the air conditioner.

The indoor unit 100 is configured like a conventional multi-unit air conditioner described as follows.

Within the indoor unit 100, a first heat exchanger 120 is installed for conditioning air of the indoor space within which the indoor unit 100 is installed. Conditioning of the air may be accomplished by circulating the indoor air and performing a heat exchanging process on the air. The first heat exchanger 120 includes a pipe with a predetermined diameter that is bent a plurality of times, through which a refrigerant flows.

The first heat exchanger 120 has an expansion valve 140 provided at its entrance. The expansion valve 140 expands refrigerant passing through it, to reduce the pressure and the temperature of the refrigerant.

The refrigerant pipe 300 guides the flow of refrigerant between the indoor unit 100 and the outdoor unit 200. The refrigerant pipe 300 is connected from the outdoor unit 200 and branches off to each indoor unit 100, to guide the refrigerant into the first heat exchanger 120.

Accordingly, the refrigerant exchanges heat within the outdoor unit 200 with the water that is transported by the water supply pipe 420. Then the refrigerant that has exchanged heat with the water flows along the refrigerant pipe 300 to the first heat exchanger 120 installed within the indoor unit 100, thus exchanging heat with the air that is suctioned from the indoor space into the indoor unit 100.

The air that passes through the first heat exchanger 120 to exchange heat with refrigerant is reintroduced to the indoor space in order to condition the air within the indoor space.

In this manner, the refrigerant repeatedly flows between the indoor unit 100 and the outdoor unit 200 forming a cycle, and the water that exchanges heat with refrigerant in the outdoor unit 200 is guided by the water return pipe 440 to flow into the cooling tower 400 to complete a cycle of water flow.

Figure 2:
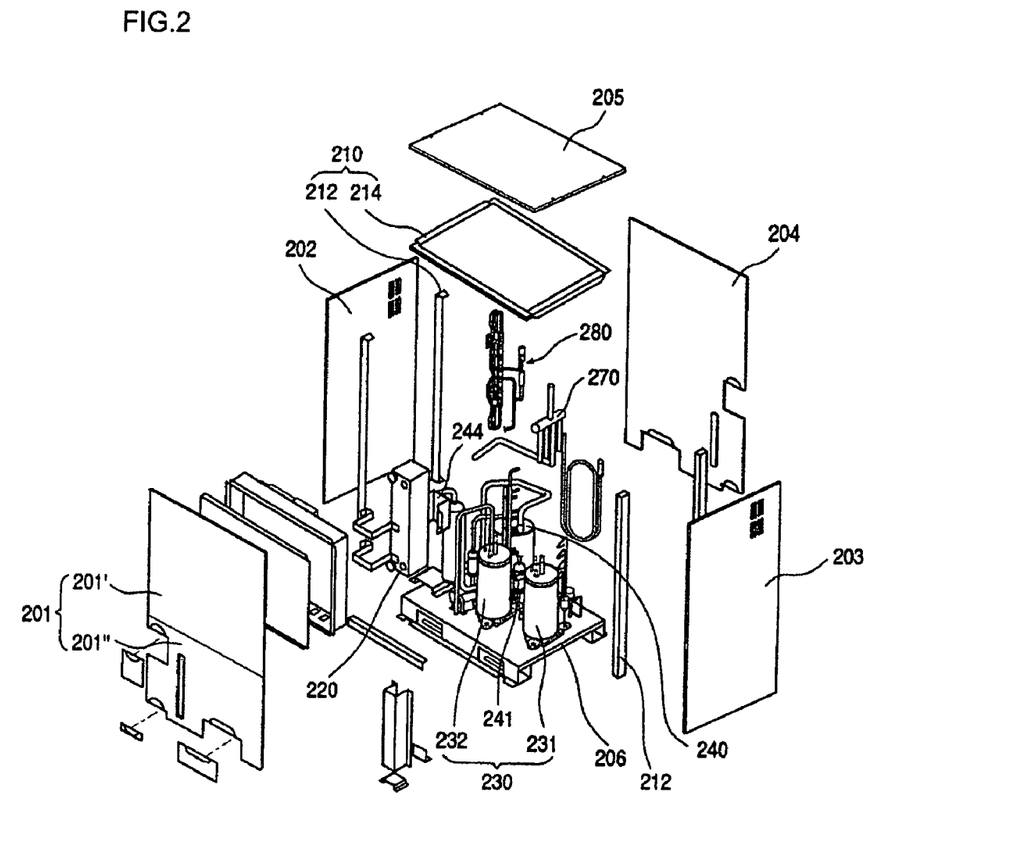
FIG. 2 is an exploded perspective view of an outdoor unit of a multi-unit water-cooled air conditioner according to a preferred embodiment of the present invention.

Below, a detailed description of the outdoor unit of the multi-unit air conditioner will be given with reference to FIGS. 1 and 2. FIG. 2 is an exploded perspective view of an outdoor unit of a multi-unit water-cooled air conditioner according to a preferred embodiment of the present invention.

Referring to FIG. 2, the outdoor unit 200 is formed with a hexahedral overall outer shape. This outdoor unit 200 includes a front panel 201 forming the front exterior thereof, a left side panel 202 forming the left side surface thereof, a right side panel 203 forming the right side surface thereof, a rear panel 204 forming the rear exterior thereof, an upper panel 205 forming the upper exterior thereof, and a base 206 forming the lower exterior thereof, with the above being mutually connected to form the exterior of the outdoor unit 200.

Accordingly, the outdoor unit 200 forms an inner space of a predetermined size, which has a plurality of components installed therein for conditioning the air of the indoor space.

The front panel 201 includes a front upper panel portion 201' at the upper part of the panel and a front lower panel portion 201" installed at a lower part of the panel. This is to facilitate servicing access from the outside by a service person.

The front panel 201 and the rear panel 204 are formed correspondingly, so that the front panel 201 and the rear panel 204 may be switched, and the left side panel 202 and the right side panel 203 are also formed correspondingly, so that they may also be mutually switched.

Because the front panel 201 and the rear panel 204, and the left side panel 202 and the right side panel 203 are thus formed to mutually correspond, the ease of assembly of the outdoor unit 200 is improved, and manufacturing of the respective panels is made easier to increase manufacturability.

The base 206 forming the outer lower surface of the outdoor unit 200 is formed in a rectangular shape with a predetermined thickness.

Each panel forming the exterior of the outdoor unit 200 is formed in approximately rectangular shapes with predetermined thicknesses, and each panel is fixed to and supported on a frame 210. The frame 210 includes vertical frames 212 that extend upward from the upper surface of the base 206 at the four corners thereof, and a horizontal frame 214 fixed to the upper ends of the vertical frames 212 to connect the mutual upper ends of the vertical frames 212. The vertical frames 212 are elongated rectangular plate shapes with a predetermined thickness, and are bent corresponding to the respective corners thereof. The inner surface of the horizontal panel is fixed to the outer surfaces of each of the vertical frames 212 that are thus bent corresponding to the respective corners thereof, forming the outer frame of the outdoor unit 200.

A second heat exchanger 220 for performing heat exchanging of the refrigerant is installed on the upper surface of the base 206. The second heat exchanger 220 is in an elongated hexahedral form extending vertically, and forms a predetermined space within. The inner space of the second heat exchanger 220 contains a plurality of thin plates (not shown) spaced at predetermined intervals apart, forming spaces between the thin plates. Refrigerant and water flow through these spaces.

That is, refrigerant flows from top to bottom through the space at the very front from the spaces formed between the plurality of thin plates (not shown), and water flows through the next space farther back upward from the bottom. Thus, refrigerant and water flow in opposite directions, and the heat that is exchanged through the thin plates allow heat exchange between refrigerant and water to occur.

A water supply 221 that is a passage for supplying water to the inside of the second heat exchanger 220 is formed to protrude in a forward direction from the lower right portion of the front surface of the second heat exchanger 220. The water supply 221 is formed of a cylindrically shaped pipe with predetermined diameter, configured to communicate with the inner space of the second heat exchanger 220.

The front upper right end of the second heat exchanger 220 has a water return portion 222 that is a passage for water that has exchanged heat in the inner space of the second heat exchanger 220. The water return portion 222 is formed similar in shape to that of the water supply 221.

The end of the water supply 221 is connected to the water supply pipe 420 and receives cooled water from the cooling tower 400. That is, the water that is cooled in the cooling tower 400 is guided by the water supply pipe 420 and passes through the water supply 221 to the inner space of the second heat exchanger 220.

The end of the water return portion 222 is connected to the water return pipe 440, and transmits the heat exchanged water back to the cooling tower 400. That is, the water that has exchanged heat with the refrigerant passes through the water return portion 222 and is guided by the water return pipe 440 to the cooling tower 400. The returned water is cooled again in the cooling tower 400 and is re-supplied to the inner space of the second heat exchanger 220.

Refrigerant flows into the inner space of the second heat exchanger 220 through a refrigerant inlet 223 and a refrigerant outlet 224 formed to the left of the water supply 221 and the water return portion 222. The refrigerant inlet 223 is formed to the left of the water return portion 222, that is, at the front upper left end of the second heat exchanger 220, and the refrigerant outlet 224 is formed to the left of the water supply 221, that is, at the front lower left end of the second heat exchanger 220. The refrigerant inlet 223 and refrigerant outlet 224 are formed similar in shape to that of the water supply 221 and the water return portion 222.

To the right of the second heat exchanger 220 are a pair of compressors 230 installed to compress the refrigerant to a high temperature and high pressure. The outer shapes of the compressors 230 extend vertically and are cylindrical in shape, each having a predetermined diameter. An inverter compressor 231 that operates variably according to a load is installed to the right, and a constant speed compressor 232 that operates at a constant speed is installed to the left of the inverter compressor 231.

The compressors 230 used may be high-pressure scroll compressors that emit minimal noise while having a highly effective compression capability. Such a high-pressure scroll compressor compresses refrigerant at a high rate of compression.

This pair of compressors 230 operates differently depending on the load of an indoor space that is imposed. That is, in the case of a light load, the inverter compressor 231 first operates, and as the load gradually increases so that the inverter compressor 231 is insufficient to handle the load by itself, the constant speed compressor 232 begins operation.

An accumulator 240 is provided on one side of the compressors 230. The accumulator 240 is formed in a cylindrical shape with a predetermined diameter, and filters liquid refrigerant from the refrigerant that is flowing into the compressors, and allows only the gaseous form to enter the compressors 230.

If the refrigerant remaining in liquid form that was not evaporated while flowing from the indoor unit 100 enters the insides of the compressors 230, an increase in load is imposed on the compressors 230. An increase in load may cause damage to the compressors.

Accordingly, the refrigerant that enters the inner spaces of the compressors 230 first passes through the accumulator 240, so that gaseous refrigerant and liquid refrigerant are separated, after which only the gaseous refrigerant is permitted to flow inside the compressors 230.

The liquid refrigerant that enters the inside of the accumulator 240 is heavier than the gaseous refrigerant, thus it is stored at the bottom of the accumulator 240, while the gaseous refrigerant that is disposed above the liquid refrigerant flows into the insides of the compressors 230.

An oil separator 241 is provided to separate oil included in the refrigerant that is discharged from outlets of the compressors 230. The oil separator 241 has an exterior that is cylindrical in shape with a predetermined diameter, and separates oil included in refrigerant that is compressed inside the compressors 230 and discharged therefrom.

The oil that is separated from the refrigerant discharged from the compressors 230 is used to cool frictional heat generated during the operation of the compressors 230. The oil that is included in the refrigerant passes through the oil separator 241 and is separated from the refrigerant, and the separated oil is returned to the interiors of the compressors 230.

The oil separator 241 includes a first oil separator 242 that separates oil included in refrigerant that is discharged from the inverter compressor 231 and a second oil separator 243 that separates oil included in refrigerant discharged from the constant speed compressor 232.

An oil separator check valve 244 is further included at the outlet of the oil separator 241 to prevent reverse flow of refrigerant. Specifically, the oil separator check valve 244 prevents compressed refrigerant from flowing backward into the compressors 230 when only one of the constant speed compressor 232 and the inverter compressor 231 are operating.

An oil return portion 250 is installed between the constant speed compressor 232 and the inverter compressor 231, so that the oil of the constant speed compressor 232 and the inverter compressor 231 maintains equilibrium. The oil return portion 250 adds oil from one compressor 230 to another compressor 230 when oil in the latter 230 is about to be deficient, thereby preventing damage to the compressors 230.

The first oil separator 242 separates oil that is included in refrigerant discharged while the inverter compressor 231 operates. This first oil separator 242 includes a first oil return pipe 251 communicating with the inlet of the inverter compressor 231, for guiding the flow of separated oil to return to the interior of the inverter compressor 231. The oil discharged from the inverter compressor 231 first passes through the first oil separator 242 to be separated from the refrigerant, and is then guided by the first oil return pipe 251 back to the inverter compressor 231.

The first oil return pipe 251 has a first return uniform flow pipe 252 formed to branch therefrom, for guiding a portion of the oil flowing in the first oil return pipe 251 to the constant speed compressor 232. The first return uniform flow pipe 252 has one end formed to communicate with the first oil return pipe 251, and the other end thereof is formed to communicate with the inlet of the constant speed compressor 232.

The first return uniform flow pipe 252 has a first return valve 253 installed thereon that selectively opens and closes the first return uniform flow pipe 252 according to a load capacity of the inverter compressor 231. The first return valve 253 is an electronic valve that can control the degree that it is opened, so that the amount of oil flowing can be adjusted according to the performance needs of the inverter compressor 231.

The constant speed compressor 232 includes a second oil separator 243 installed thereon for separating the oil included in the refrigerant discharged from the constant speed compressor 232. The oil separated by the second oil separator 243 is guided to flow into the constant speed compressor 232 by a second oil return pipe 254 that is formed to communicate with the second oil separator 243 at one end and the inlet of the constant speed compressor 232 at the other end.

A second return uniform flow pipe 255 branches from the second oil return pipe 254 to guide the flow of a portion of the oil flowing within the second oil return pipe 254 to the inverter compressor 231. One end of the second return uniform flow pipe 255 is formed to communicate with the second oil return pipe 254, and the other end is formed to communicate with the inlet of the inverter compressor 231.

A second return valve 256 is installed on the second return uniform flow pipe 255 to selectively open and close the second return uniform flow pipe 255 according to the operation of the constant speed compressor 232. The second return valve 256 is an electronic valve that controls the amount that it opens.

Also, uniform flow pipes 261 and 263, for guiding the oil filled in each of the compressors 230 to another compressor with a lack of oil, are respectively installed at the sides of the inverter compressor 231 and the constant speed compressor 232, that is, the inverter compressor 231 has a first uniform flow pipe 261 formed thereon to guide the flow of oil from the inside of the inverter compressor 231 to the constant speed compressor 232, and the constant speed compressor 232 has a second uniform flow pipe 263 formed thereon to guide the flow of oil from the inside of the constant speed compressor 232 to the inverter compressor 231.

One end of the first uniform flow pipe 261 is formed to communicate with the inverter compressor 231, and the other end is formed to communicate with the inlet of the constant speed compressor 232. One end of the second uniform flow pipe 263 is formed to communicate with the constant speed compressor 232, and the other end is formed to communicate with the inverter compressor 231.

The first uniform flow pipe 261 has a first uniform flow valve 262 installed thereon to selectively control the degree of opening and closing of the first uniform flow pipe 261 according to the operation of the inverter compressor 231. The second uniform flow pipe 263 has a second uniform flow valve 264 installed thereon to control the degree of opening and closing of the second uniform flow pipe 263 according to the operation of the constant speed compressor 232.

Accordingly, the first uniform flow valve 262 and the second uniform flow valve 264 control the flow of oil through the first uniform pipe 261 and the second uniform pipe 263, so that the quantity of flowing oil can be controlled.

The first uniform flow pipe 261 and the second uniform flow pipe 263 guide the oil so that the oil in the inverter compressor 231 and the constant speed compressor 232 flows therebetween to balance the level of oil in the inverter compressor 231 and the constant speed compressor 232.

The oil separator 241 communicates with a main refrigerant valve 270 (to be described below) through pipes. The main refrigerant valve 270 is generally a four-way valve, that switches the flow direction of refrigerant according to whether a cooling or heating mode is in operation, and the ports of the valve are respectively connected to the second heat exchanger 220, the first heat exchanger 120, and the accumulator 240.

Thus, the refrigerant discharged from the constant speed compressor 232 and the inverter compressor 231 flows into the main refrigerant valve 270, and a hot gas pipe 272 is provided for directly discharging a portion of the refrigerant flowing into the main refrigerant valve 270 between the oil separator 241 and the main refrigerant valve 270 to the accumulator 240.

The hot gas pipe 272 is a component that allows the high-pressure refrigerant discharged from the compressors 230 to be directly supplied to the accumulator 240, when there is a need to raise the pressure of low pressure refrigerant flowing to the accumulator 240 during the operation of the air conditioner. A hot gas valve 274, serving as a bypass valve, is installed on the hot gas pipe 272 to open and close the hot gas pipe 272.

The overcooler 280 is provided to one side of the compressors 230. The overcooler 280 is installed in an arbitrary location with the refrigerant pipe 300 connecting the second heat exchanger 220 and the first heat exchanger 120, and is a device for overcooling the refrigerant that passes through the refrigerant pipe 300 therein.

The above-described overcooler 280, that is a main component in the structure of the air conditioner according to the present invention, will be described below in further detail with reference to the drawings. The overcooler 280 is provided in plurality, and the plurality of overcoolers 280 may be installed in rows, in-line, or in both rows and in-line.

Figure 3:
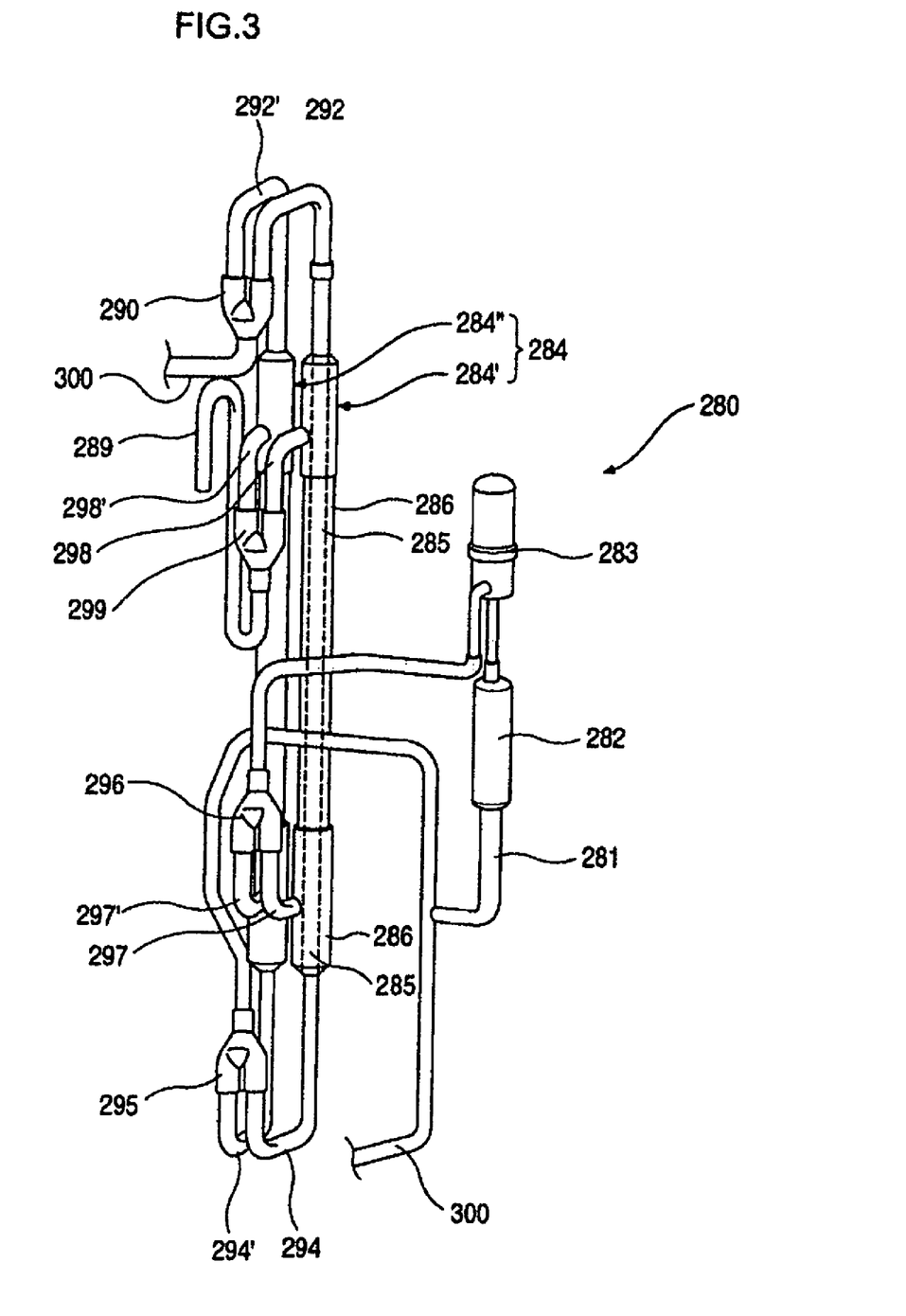
FIG. 3 is a perspective view of an overcooler installed in an outdoor unit of a multi-unit water-cooled air conditioner according to a preferred embodiment of the present invention.

FIG. 3 is a perspective view of an overcooler installed in an outdoor unit of a multi-unit water-cooled air conditioner according to a preferred embodiment of the present invention.

Referring to FIG. 3, the overcooler 280 is formed to branch off from the refrigerant pipe 300, and includes a reverse transfer pipe 281 for guiding a portion of the refrigerant flowing within the refrigerant pipe 300, an expansion valve 282 installed on the reverse transfer pipe 281 for expanding refrigerant that flows along the inside of the reverse transfer pipe 281, an overcooling valve 283 installed on the reverse transfer pipe 281 for controlling the flow of the expanded refrigerant through the expansion valve 282, a plurality of overcooling pipes 284 that perform heat exchanging of refrigerant flowing within the refrigerant pipe 300 after passing through the overcooling valve 283, and an overcooling return pipe 289 for guiding the heat exchanged refrigerant that has passed through the overcooling pipes 284 to the accumulator 240.

The overcooler 280 has an overall straight linear shape and is vertically disposed. Accordingly, when the refrigerant that flows along the reverse transfer pipe 281 passes through the overcooling pipes 284, the refrigerant exchanges heat in the vertically disposed elongated cylindrical pipe-shaped overcooling pipes 284.

In further detail, the refrigerant pipe 300 communicating with the second heat exchanger 220 is bent upward (in FIG. 3). The refrigerant pipe 300 that is bent upward branches in two. That is, the refrigerant pipe 300 is connected to a dividing manifold 290 that is formed in a 'Y' shape and separates the refrigerant flowing within the refrigerant pipe 300 in two.

The dividing manifold 290 is thus installed respectively to a first refrigerant inlet pipe 292 and a second refrigerant inlet pipe 292'. Therefore, the refrigerant (main refrigerant) flowing from the refrigerant pipe 300 is guided by the first and second refrigerant inlet pipes 292 and 292'.

Although not shown, the dividing manifold 290 may include a refrigerant control valve that controls the amount of refrigerant flowing to the first and second refrigerant inlet pipes 292 and 292'.

The first and second refrigerant inlet pipes 292 and 292' are connected to the upper end of the overcooling pipe 284. That is, the overcooling pipe 284 is formed into a first overcooling pipe 284' and a second overcooling pipe 284". The first refrigerant inlet pipe 292 is connected to the top end of the first overcooling pipe 284', and the second refrigerant inlet pipe 292' is connected to the top end of the second overcooling pipe 284". Also, a first refrigerant outlet pipe 294 and a second refrigerant outlet pipe 294' are respectively connected to lower end of the overcooling pipe 284 formed in a vertically elongated cylindrical pipe shape. Likewise, the first overcooling pipe 284' and the second overcooling pipe 284" are respectively provided between the first refrigerant inlet pipe 292 and the second refrigerant inlet pipe 292' and the first refrigerant outlet pipe 294 and the second refrigerant outlet pipe 294'.

The first refrigerant outlet pipe 294 and the second refrigerant outlet pipe 294' are connected to the lower end of the overcooling pipe 284, and extend downward bending in a "U" shape to rise upward. The first refrigerant outlet pipe 294 bent upward and the second refrigerant outlet pipe 294' meet at a combining manifold 295. The combining manifold 295, as shown in FIG. 3, is formed in the same shape as the dividing manifold 290, and combines the divided flow of refrigerant.

The upper end of the combining manifold 295 is connected to the refrigerant pipe 300, and the refrigerant pipe 300 is bent to the right (as seen in FIG. 3) to proceed downward again. The refrigerant pipe 300 is bent to proceed forward in the downward direction.

The reverse transfer pipe 281 branches off to the right (in FIG. 3) from the refrigerant pipe 300. The reverse transfer pipe 281 is then bent upward and proceeds to change direction downward. After communication with expansion valve 282 and overcooling valve 283.

The reverse transfer pipe 281 extends from overcooling valve 283 and is bent downward, then bent again to the left (in FIG. 3). The reverse transfer pipe 281 is then bent again in a downward direction, and is connected to a reverse manifold 296.

The reverse manifold 296 is formed in the same shape as the dividing manifold 290 and performs the same function as the dividing manifold 290. That is, the reverse manifold 296 divides the refrigerant (divided refrigerant) flowing in a reverse direction through the reverse transfer pipe 281 into two.

Accordingly, the first reverse transfer pipe 297 and the second reverse transfer pipe 297' are respectively connected to the lower ends of the reverse manifold 296, and the first and second reverse transfer pipes 297 and 297' are connected proximally to the lower ends of the first and second overcooling pipes 284' and 284". The lower ends of the first and second reverse transfer pipes 297 and 297' are connected to communicate with the lower end of an outer pipe 286 (described below) of the overcooling pipe 284.

An overcooling return pipe 289 is connected to the outer upper circumference of the overcooling pipe 284 for guiding refrigerant that flows through the inside of the overcooling pipe 284 and then through the reverse transfer pipe 281. The overcooling return pipe 289 is further connected to the entrance of the accumulator 240.

In further detail, a first return pipe 298 and a second return pipe 298' are respectively in fluid communication with the upper ends of the overcooling pipe 284, for discharging refrigerant that flows into and passes through the overcooling pipe 284 from the reverse transfer pipe 281. That is, the first return pipe 298 is formed in an inverted "L" shape (in FIG. 3) at the top end of the first overcooling pipe 284', and the second return pipe 298' is formed in an inverted "L" shape (in FIG. 3) at the top end of the second overcooling pipe 284".

The bottom ends of the first return pipe 298 and the second return pipe 298' have a reverse manifold 299 formed thereon, so that the refrigerant flowing through the first and second return pipes 298 and 298' is mixed and guided to flow into the overcooling return pipe 289. The reverse manifold 299 is formed in a shape similar to the combining manifold 295, and like the combining manifold 295 it combines and guides the flow of the refrigerant.

To describe the structure of the reverse transfer pipe 281 in more detail, the reverse transfer pipe 281 is fixed to the lower portion of the overcooling pipe 284 and is bent a plurality of times in different varying directions, extending above and to the right (in FIG. 3) of a portion of the outer surface of the refrigerant pipe 300.

The reverse transfer pipe 281 extending to the right of the refrigerant pipe 300 is then bent in an upward direction. The upwardly bent reverse transfer pipe 281 has the expansion valve 282 installed therein. The expansion valve 282 is formed in a cylindrical shape having a predetermined diameter, and has a cross-sectional area that is larger than that of the reverse transfer pipe 281.

An overcooling valve 283 is installed on the reverse transfer pipe 281 above the expansion valve 282. The reverse transfer pipe 281 having the overcooling valve 283 installed thereon is bent such that it passes through the overcooling valve 283 and proceeds in a downward direction and then proceeds to the left (in FIG. 3).

The reverse transfer pipe 281 that is bent to proceed to the left is then bent to proceed downward (in FIG. 3), and the reverse transfer pipe 281 bent downward is connected to the reverse manifold 296.

Also, the overcooling return pipe 289 extends downward and is connected to the lower end of the reverse manifold 299. The overcooling return pipe 289 is then bent in a "U" shape to extend upward from the reverse manifold 299, and is then bent upward is then bent back downward in an inverted "U" shape. The downwardly bent overcooling return pipe 289 is then bent a plurality of times further (not shown), and is then fastened to communicate with the inlet pipe of the accumulator 240.

The expansion valve 282 is installed in the reverse transfer pipe 281, and expands and cools the refrigerant (divided refrigerant) flowing through the reverse transfer pipe 281. That is, the expansion valve 282 has a diameter larger than that of the reverse transfer pipe 281, so that the refrigerant (divided refrigerant) flowing through the inside of the reverse transfer pipe 281 loses heat as it expands.

This is because the refrigerant (divided refrigerant) flowing through the inside of the reverse transfer pipe 281 flows into a suddenly wider space so that it expands in volume and loses the heat that it could not exchange in other areas. Similarly, the refrigerant flowing backward in the reverse transfer pipe 281 expands and loses heat while passing through the expansion valve 282, so that the temperature of the refrigerant drops. Accordingly, the refrigerant passing within the reverse transfer pipe 281 is further cooled while passing the expansion valve 282.

Then, the refrigerant (divided refrigerant) that becomes overcooled while passing through the expansion valve 282 flows to the overcooling valve 283. The overcooling valve 283 controls the flow of refrigerant that passes through the expansion valve 282 and has been reduced to a low temperature. The refrigerant (divided refrigerant) that passes through this overcooling valve 283 then flows along the reverse transfer pipe 281 and flows into the overcooling pipe 284.

The overcooling pipe 284 is formed of a double pipe that extends vertically. The overcooling pipe 284 includes an inner pipe 285 passing through the central portion of the overcooling pipe 284, and an outer pipe 286 formed to enclose the outer surface of the inner pipe 285.

The inner pipe 285 is formed respectively between the first refrigerant inlet pipe 292 and the first refrigerant outlet pipe 294, and the second refrigerant inlet pipe 292' and the second refrigerant outlet pipe 294'. The inner pipe has the same diameter as the first refrigerant inlet pipe 292 and the first refrigerant outlet pipe 294, and may be integrally formed with the first refrigerant inlet pipe 292 and the first refrigerant outlet pipe 294.

Also, the inner pipe 285 is formed of a material with a high thermal conductivity. That is, the inner pipe 285 is formed of metal, so that the heat from the refrigerant flowing within can be readily transferred to the refrigerant flowing on the outside.

The outer pipe 286 is formed with a larger diameter than that of the inner pipe 285 in order to enclose the outside of the latter, and is formed to allow the first reverse transfer pipe 297 and the first return pipe 298, and the second reverse transfer pipe 297' and the second return pipe 298' to mutually communicate.

Figure 4:
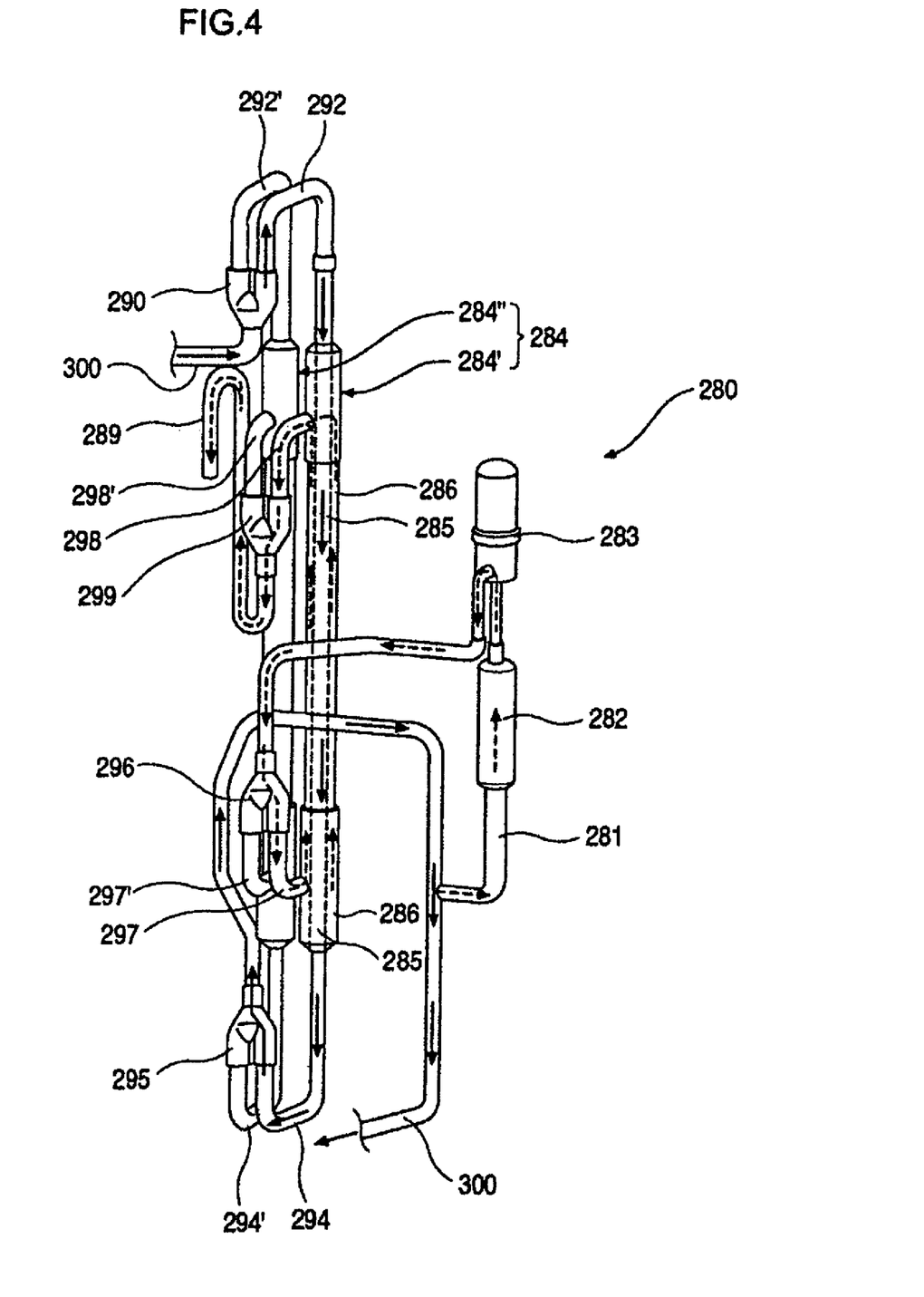
FIG. 4 is a perspective view showing the flow of coolant through an overcooler installed in an outdoor unit of a multi-unit water-cooled air conditioner according to a preferred embodiment of the present invention.

Below, a description of the flow of coolant within the overcooler 280 will be given with reference to FIG. 4. FIG. 4 is a perspective view showing the flow of coolant through an overcooler installed in an outdoor unit of a multi-unit water cooled air conditioner according to a preferred embodiment of the present invention.

When an air conditioner is operated in cooling mode, the refrigerant that passes the second heat exchanger 220 passes through the overcooler 280 to be further cooled.

In further detail, the refrigerant (main refrigerant) discharged from the second heat exchanger 220 flows through the refrigerant pipe 300, and into the dividing manifold 290 to be divided in two. It then flows into the first overcooling pipe 284' and the second overcooling pipe 284" through the first refrigerant inlet pipe 292 and the second refrigerant inlet pipe 292'.

The refrigerant (main refrigerant) that flows into the overcooling pipe 284 through the first refrigerant inlet pipe 292 and the second refrigerant inlet pipe 292' flows through the inner pipe 285 into the first overcooling pipe 284' and second overcooling pipe 284". The refrigerant that flows through the inner pipe 285 inside the overcooling pipe 284 flows through the first refrigerant outlet pipe 294 and the second refrigerant outlet pipe 294' and mixes in the combining manifold 295, after which it flows again through the refrigerant pipe 300.

A portion of the refrigerant (main refrigerant) that flows through the refrigerant pipe 300 after passing through the inner pipe 285 flows in a reverse direction through the reverse transfer pipe 281.

The refrigerant (divided refrigerant) that is divided and flows by means of the reverse transfer pipe 281 is further cooled as it passes the expansion valve 282, so that the resulting cooled refrigerant (divided refrigerant) passes through the overcooling valve 283 and passes through the outer pipe 286 of the overcooling pipe 284 from the bottom to the top. That is, the refrigerant (divided refrigerant) that passes through the overcooling valve 283 is divided between the first reverse transfer pipe 297 and the second reverse transfer pipe 297' in the reverse manifold 296, and then flows into the lower portion of the outer pipe 286 of the first overcooling pipe 284' and second overcooling pipe 284".

As the refrigerant (divided refrigerant) flows in an upward direction in the overcooling pipe 284, through a lower portion of each outer pipe 286, a heat exchange occurs. That is, refrigerant (divided refrigerant) that is comparatively cooler flows through the outer pipe 286, and refrigerant (main refrigerant) flowing within the inner pipe 285 is comparatively hotter. Thus, the refrigerant (main refrigerant) that passes through the inside of the inner pipe 285 exchanges heat with the refrigerant (divided refrigerant) flowing around the outside of outer pipe 286 so that it is further cooled.

The refrigerant (divided refrigerant), that flows through the outer pipe 286 and absorbs heat from the refrigerant (main refrigerant) that passes through the inner pipe 285, becomes comparatively hotter and is discharged to the outside through the first return pipe 298 and the second return pipe 298'. The refrigerant (divided refrigerant) that is discharged through the first return pipe 298 and the second return pipe 298' combines in the reverse manifold 299, and then flows through the overcooling return pipe 289. It is noted that the above description of refrigerant flow through the overcooler 280 may indicate one possible embodiment, and other refrigerant flow schemes are may also be envisioned. For example, the flow of main refrigerant and divided refrigerant through the overcooler 280 may be reversed, where the main refrigerant passes through the outer pipe 286 and the divided refrigerant is directed by the inner pipe 285.

Figure 5:
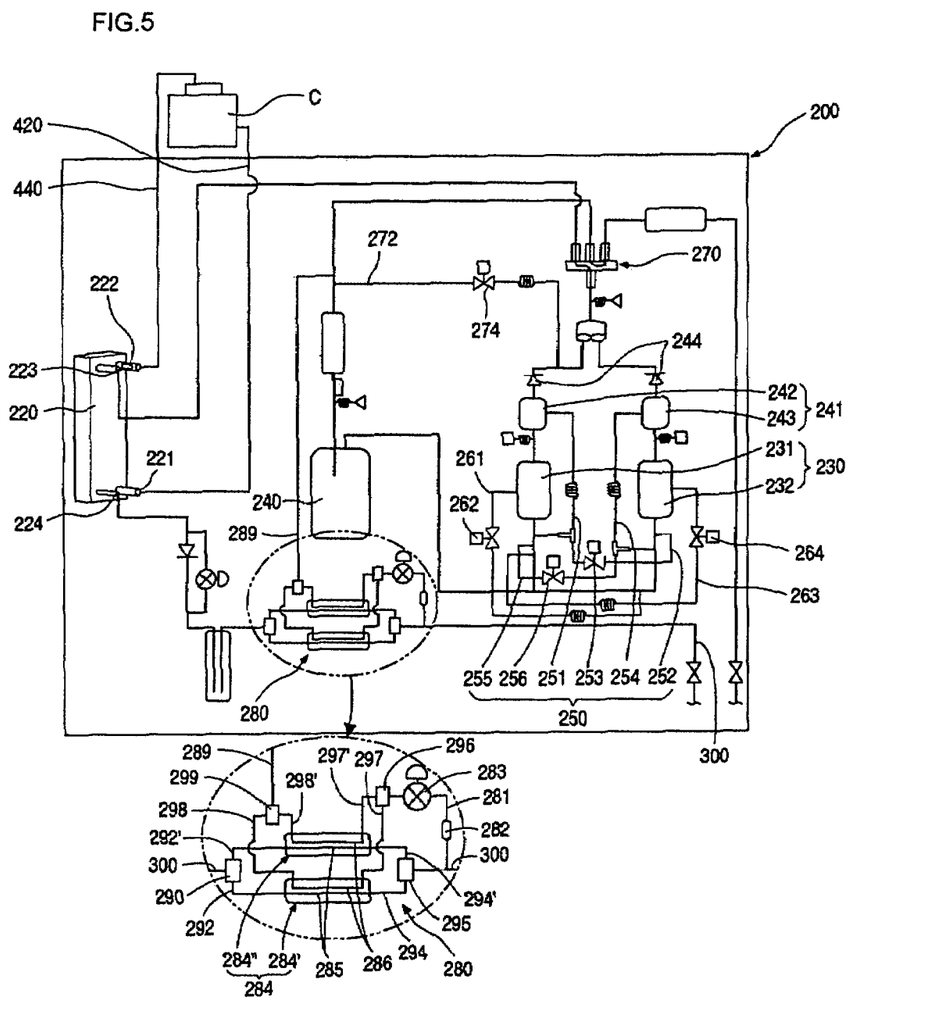
FIG. 5 is a block configurative diagram of an outdoor unit of a multi-unit water-cooled air conditioner according to a preferred embodiment of the present invention.

Below, FIGS. 1 and 5 will be referred to in describing the effects of the above-structured air conditioner with respect to the flow of the refrigerant. FIG. 5 is a block configurative diagram of an outdoor unit of a multi-unit water-cooled air conditioner according to a preferred embodiment of the present invention.

First, to use a water-cooled air conditioner, a user applies an external power source to the air conditioner. When the external power source is applied to the air conditioner, the compressors 230 operate, causing refrigerant contained therein to be compressed to high temperature and highly compressed gaseous refrigerant.

The refrigerant that is turned into a high temperature, high-pressure gas in the compressors 230 passes through the oil separator 241 to separate the oil contained in the refrigerant and return the oil to the insides of the compressors 230, whereupon the refrigerant that has been separated from the oil flows toward the main refrigerant valve 270.

The refrigerant that flows to the main refrigerant valve 270 flows through a pipe connected to one port of the main refrigerant valve 270 and flows into the inner space of the second heat exchanger 220. The refrigerant that flows into the inner space of the second heat exchanger 220 exchanges heat with water that is located inside and the refrigerant changes to a low temperature, high pressure liquid state.

The refrigerant (main refrigerant) that has changed to a low temperature, high-pressure liquid state is divided by the refrigerant pipe 300 and passes through the overcooler 280 that includes a plurality of overcooling pipes 284. The refrigerant (main refrigerant that passes through the overcooler 280 is further cooled therein. The heat exchange in the overcooler 280 is as described above.

Similarly, refrigerant passes through the second heat exchanger 220 then past a plurality of overcooling pipes 284 to be overcooled and flows into the first heat exchanger 120. The refrigerant exchanges heat with indoor air inside the first heat exchanger 120.

The refrigerant that passes through the overcooler 280 to become overcooled then passes through the expansion valve 140. The refrigerant that passes through the expansion valve 140 loses pressure due to expansion, and flows into the first heat exchanger 120 in such a state.

The refrigerant that is a low temperature, low-pressure liquid flows into the first heat exchanger 120, and exchanges heat with the air to be conditioned, thereafter becoming a high temperature, low pressure gas.

The refrigerant that has been phase changed to a high temperature, low pressure gas while passing through the first heat exchanger 120 flows along pipes, connected to a port of the main refrigerant valve 260, and passes through the main refrigerant valve 260. The refrigerant that passes through the main refrigerant valve 260 flows through a pipe communicating with the accumulator 240 to flow into the accumulator 240.

The refrigerant that flows into the accumulator 240 completes a cycle by being separated into refrigerant in a gaseous state and a liquid state within the accumulator 240, of which only the gaseous state refrigerant flows into the compressors 230.

The refrigerant that flows in reverse through the reverse transfer pipe 281 of the overcooler 280 first passes through the outer pipe 286 of the overcooling pipe 284, and then passes through the overcooling return pipe 289 to return to the accumulator 240.

When the water-cooled air conditioner is operated in heating mode, the flow of refrigerant is in the reverse order of the flow of refrigerant when the air conditioner is operating in cooling mode as described above. Therefore, a description of the flow of refrigerant in heating mode will be omitted.

Figure 6:
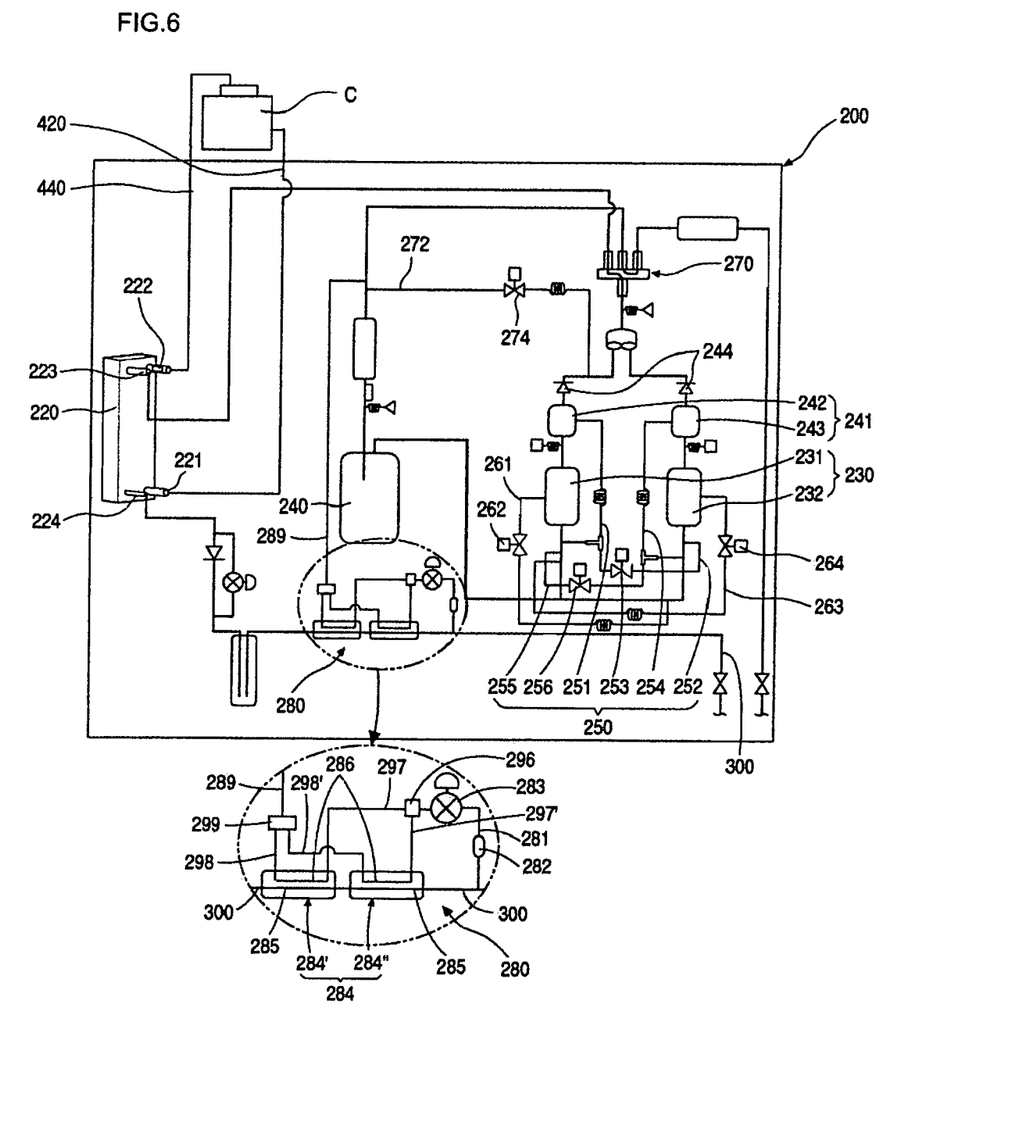
FIG. 6 is a block configurative diagram of an overcooler according to another embodiment of the present invention.

FIG. 6 is a block configurative diagram of an overcooler 280 according to another embodiment of the present invention. That is, FIG. 6 is a block configurative diagram of the plurality of overcooling pipes 284 arranged in-line.

Referring to FIG. 6, when the first overcooling pipe 284' and the second overcooling pipe 284" are arranged in-line, the overcooling pipe's 284 configuration is virtually the same. That is, the first and second overcooling pipes 284' and 284" are formed of an inner pipe 285 and an outer pipe 286 as described above. The only difference is that there is no need to branch the refrigerant pipe 300 to both sides, so that there is no need for the dividing manifold 290 and the combining manifold 295.

Accordingly, the refrigerant (main refrigerant) passing through the second heat exchanger 220 passes the first and second overcooling pipes 284' and 284" in sequence. That is, the refrigerant sequentially flows through the inner pipe 285 of the first overcooling pipe 284' and the second overcooling pipe 284".

Also, a portion of the refrigerant (divided refrigerant) flows in a reverse direction through the reverse transfer pipe 281 and through the expansion valve 282, in which it cools further. The further cooled refrigerant then passes through the overcooling valve 283 and into the outer pipe 286 of the overcooling pipe 284 in a direction from the bottom to the top. Specifically, the refrigerant that passes the overcooling valve 283 is first divided into the first reverse transfer pipe 297 and the second reverse transfer pipe 297' in the reverse manifold 296, and then flows into the outer pipes 286 of the first and second overcooling pipes 284' and 284".

The refrigerant (divided refrigerant) that flows into each of the outer pipes 286 exchanges heat with refrigerant passing through the inner pipe 285. Thus, the refrigerant (main refrigerant) of the inner pipe 285 exchanges heat with the refrigerant flowing through the outer pipe 286 and becomes cooled even further.

The refrigerant (divided refrigerant) that has passed through the outer pipe 286 and absorbed heat from the refrigerant (main refrigerant) passing through the inner pipe 285 becomes comparatively hotter and is discharged through the first and second return pipes 298 and 298'. The refrigerant (divided refrigerant) that has been discharged through the first and second return pipes 298 and 298' is combined in the reverse manifold 299, and then flows to the accumulator 240 through the overcooling return pipe 289.

The overcooler 280, as described above, may have its plurality of overcooling pipes 284 arranged in-line or in rows.

Figure 7:
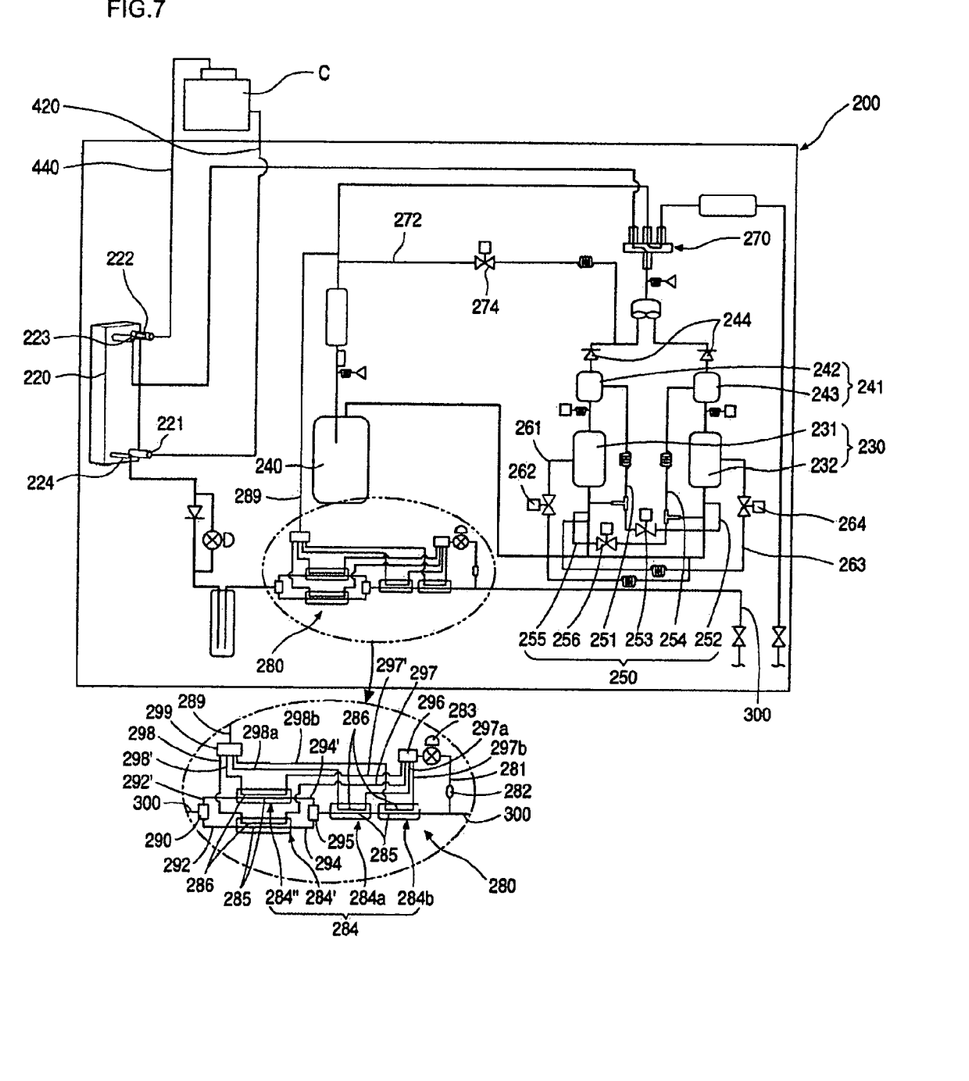
FIG. 7 is a block configurative diagram of an overcooler according to a further embodiment of the present invention.

FIG. 7 is a block configurative diagram of an overcooler 280 according to a further embodiment of the present invention with a plurality of overcooling pipes 284 arranged in rows and in-line.

The overcooler 280 shown in FIG. 7 is a combination of the overcoolers in FIGS. 5 and 6 arranged in rows and in-line, respectively. Accordingly, because the exemplary embodiment shows components having features that are the same as in the above, a detailed description thereof will be omitted.

Specifically, because the first overcooling pipe 284' and the second overcooling pipe 284" in the overcooler 280 of FIG. 7 are connected in a row, this configuration is the same as the embodiments described in FIGS. 3 through 5.

Here, an in-line structure shown in the embodiment of FIG. 6 is added. That is, a third overcooling pipe 284a and a fourth overcooling pipe 284b are further installed. As shown in FIG. 7, the third and fourth overcooling pipes 284a and 284b are connected respectively in-line to the second overcooling pipe 284".

The inner structures of the third and fourth overcooling pipes 284a and 284b are the same as those of the above-described first and second overcooling pipes 284' and 284", and are structured with the inner pipe 285 and outer pipe 286, where the inner pipe 285 communicates with the refrigerant pipe 300, and the outer pipe 286 communicates with the reverse transfer pipe 281.

Accordingly, a third reverse transfer pipe 297a and a fourth reverse transfer pipe 297b are respectively installed on the reverse manifold 296, for allowing the refrigerant to flow in reverse outside the third and fourth overcooling pipes 284a and 284b. Also, a third and a fourth return pipe 298a and 298b are respectively connected to the reverse transfer pipe 299, for guiding refrigerant discharged from the outer pipe 286 of the third and fourth overcooling pipes 284a and 284b.

As such, the refrigerant (main refrigerant) passing through the second heat exchanger 220 is divided by the dividing manifold 290, passes through one of the first or the second overcooling pipes 284' or 284", and then passes in respective turn through the inner pipe 285 of the third and fourth overcooling pipes 284a and 284b.

Then, the refrigerant (main refrigerant) that passes through the refrigerant pipe 300 flows into the indoor unit 100. A portion of this refrigerant (divided refrigerant) flows in reverse through the reverse transfer pipe 281, passes through the expansion valve 282 (where it is further cooled), and passes through the overcooling valve 283 and through the outer pipe 286 of the overcooling pipe 284.

That is, the refrigerant (divided refrigerant) that passes the overcooling valve 283 is divided by the reverse manifold 296 to respectively flow to the first and second reverse transfer pipes 297 and 297' and the third and fourth reverse transfer pipes 297a and 297b, after which it flows into the respective outer pipes 286 of the first and second overcooling pipes 284' and 284" and the third and fourth overcooling pipes 284a and 284b.

The refrigerant (divided refrigerant) that passes the respective outer pipes 286 absorbs heat from the refrigerant (main refrigerant) passing through the inner pipe 285. That is, a comparatively low temperature refrigerant (divided refrigerant) flows through the outer pipe 286, and a comparatively high temperature refrigerant (main refrigerant) flows through the inner pipe 285. Thus, the refrigerant (main refrigerant) that passes through the inside of the inner pipe 285 exchanges heat with the refrigerant (divided refrigerant) flowing through the outer pipe 286 and is cooled further.

The refrigerant (divided refrigerant) that passes through the outer pipe 286 and absorbs heat from the refrigerant (main refrigerant) passing through the inner pipe 285 has a comparatively higher temperature, so that it is discharged to the outside through the first and second return pipes 298 and 298' and the third and fourth return pipes 298a and 298b. The refrigerant (divided refrigerant) discharged through the first and second return pipes 298 and 298' and the third and fourth return pipes 298a and 298b is first combined in the reverse transfer pipe 299 and flows into the accumulator 240 through the overcooling return pipe 289.

It will be apparent to those skilled in the art that various modifications and variations can be made in the present invention. Thus, it is intended that the present invention covers the modifications and variations of this invention provided they come within the scope of the appended claims and their equivalents.

In the above-described embodiments of the present invention, when an overcooler is said to be installed on a multi-unit water-cooled air conditioner, the overcooler may be installed on a single unit water-cooled or air-cooled air conditioner.

Also, the present invention described embodiments in which the above overcooling pipe 284 is arranged in a row or in line and only one expansion valve 282 and overcooling valve 283 is used; however, the expansion valve 282 and the overcooling valve 283 may respectively be arranged in-line and in a row and provided in plurality.

Furthermore, the refrigerant (divided refrigerant) guided by the reverse transfer pipe 281 in the above-described embodiments flows through the outer pipe 286 of the overcooling pipe 284, and the refrigerant (main refrigerant) flowing through the refrigerant pipe 300 flows through the inner pipe 285 of the overcooling pipe 284. However, the reverse thereof may equally be applied to the present invention.

That is, the refrigerant (divided refrigerant) guided by the reverse transfer pipe 281 may flow through the inner pipe 285 of the overcooling pipe 284, and the refrigerant (main refrigerant) flowing through the refrigerant pipe 300 may flow through the outer pipe 286 of the overcooling pipe 284.

It will be apparent to those skilled in the art that various modifications and variation can be made in the present invention without departing from the spirit or scope of the invention. Thus, it is intended that the present inventions cover the modifications and variations of this invention provided they come within the scope of the appended claims and their equivalents.

What is claimed is:

1. An air conditioner comprising:
   two or more heat exchangers for performing heat exchanging between air or water and refrigerant;
   a refrigerant pipe for guiding refrigerant circulating between the two or more heat exchangers;
   a compressor for compressing refrigerant flowing in the refrigerant pipe to a high temperature and pressure;
   an accumulator, provided on one side of the compressor, for separating an inflowing refrigerant into a liquid refrigerant and a gaseous refrigerant; and
   an overcooler provided on one side of the heat exchangers, for further cooling refrigerant passing through the heat exchangers,
   wherein the overcooler comprises:
   a reverse transfer pipe divided from the refrigerant pipe, for guiding a divided portion of a main refrigerant flowing through the refrigerant pipe in another direction;
   an expansion unit provided on the reverse transfer pipe, for expanding the divided refrigerant guided by the reverse transfer pipe; and
   a plurality of overcooling pipes for performing heat exchange between the main refrigerant flowing through the refrigerant pipe and the divided refrigerant flowing through the reverse transfer pipe, wherein the plurality of overcooling pipes are coupled in one of parallel or series.

2. The air conditioner according to claim 1, wherein the overcooler further comprises:
   an overcooling valve provided on the reverse transfer pipe, for controlling a flow of the divided refrigerant passing through the expansion unit; and
   an overcooler return pipe for guiding divided refrigerant that passes through the plurality of overcooling pipes and exchanges heat to the accumulator.

3. The air conditioner according to claim 1, wherein the plurality of overcooling pipes guides a flow of main refrigerant that flows through the refrigerant pipe and divided refrigerant guided by the reverse transfer pipe in mutually opposite directions.

4. The air conditioner according to claim 3, wherein the plurality of overcooling pipes comprises:
   an outer pipe through which the divided refrigerant guided by the reverse transfer pipe flows; and
   an inner pipe formed through an inside of the outer pipe in a lengthwise direction thereof, for guiding the main refrigerant flowing through the refrigerant pipe.

5. The air conditioner according to claim 3, wherein the plurality of overcooling pipes comprises:
   an outer pipe through which the main refrigerant flowing through the refrigerant pipe flows; and an inner pipe formed through an inside of the outer pipe in a lengthwise direction thereof, for guiding the divided refrigerant guided by the reverse transfer pipe.

6. The air conditioner according to claim 1, further comprising a dividing manifold provided on one end of the plurality of overcooling pipes, for dividing the main refrigerant into the plurality of overcooling pipes.

7. The air conditioner according to claim 1, further comprising a reverse manifold provided on the reverse transfer pipe, for dividing the divided refrigerant into the plurality of overcooling pipes.

8. An air conditioner comprising:
two or more heat exchangers for performing heat exchanging between air or water and refrigerant;
a refrigerant pipe for guiding refrigerant circulating between the two or more heat exchangers;
a compressor for compressing refrigerant flowing in the refrigerant pipe to a high temperature and pressure;
an accumulator provided on one side of the compressor, for separating an inflowing refrigerant into a liquid refrigerant and a gaseous refrigerant; and
an overcooler provided on one side of the heat exchangers, for further cooling refrigerant passing through the heat exchangers,
wherein the overcooler comprises:
a reverse transfer pipe divided from the refrigerant pipe, for guiding a divided portion of a main refrigerant flowing through the refrigerant pipe in another direction;
an expansion unit provided on the reverse transfer pipe, for expanding the divided portion of refrigerant guided by the reverse transfer pipe; and
a plurality of overcooling pipes for performing heat exchange between the main refrigerant flowing through the refrigerant pipe and the divided refrigerant flowing through the reverse transfer pipe, wherein the plurality of overcooling pipes are connected in a combination of both parallel and serial connections.

9. The air conditioner according to claim 8, wherein the overcooler further comprises:
an overcooling valve provided on the reverse transfer pipe, for controlling a flow of the divided refrigerant passing through the expansion unit; and
an overcooler return pipe for guiding the divided refrigerant that passes through the plurality of overcooling pipes and exchanges heat to the accumulator.

10. The air conditioner according to claim 8, wherein the plurality of overcooling pipes guides a flow of main refrigerant that flows through the refrigerant pipe and divided refrigerant guided by the reverse transfer pipe in mutually opposite directions.

11. The air conditioner according to claim 10, wherein the plurality of overcooling pipes comprises:
an outer pipe through which the divided refrigerant guided by the reverse transfer pipe flows; and
an inner pipe formed through an inside of the outer pipe in a lengthwise direction thereof, for guiding the main refrigerant flowing through the refrigerant pipe.

12. The air conditioner according to claim 10, wherein the plurality of overcooling pipes comprises:
an outer pipe through which the main refrigerant flowing through the refrigerant pipe flows; and
an inner pipe formed through an inside of the outer pipe in a lengthwise direction thereof, for guiding the divided refrigerant guided by the reverse transfer pipe.

13. The air conditioner according to claim 8, further comprising a dividing manifold provided on one end of the plurality of overcooling pipes, for dividing the main refrigerant into the plurality of overcooling pipes.

14. The air conditioner according to claim 8, further comprising a reverse manifold provided on the reverse transfer pipe, for dividing the divided refrigerant into the plurality of overcooling pipes.

* * * * *